V. A. HUFFMAN.
FARM TRACTOR.
APPLICATION FILED JULY 30, 1917.
1,292,606.
Patented Jan. 28, 1919.
2 SHEETS—SHEET 1.
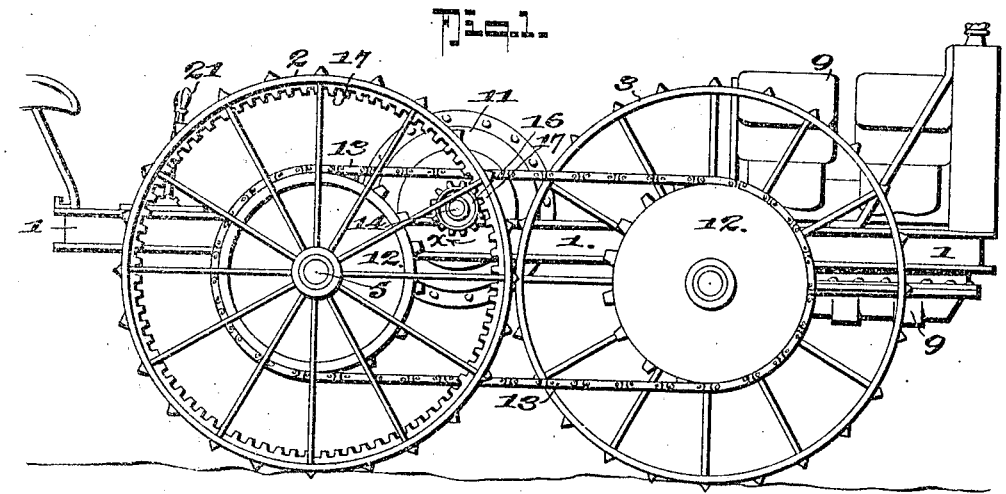
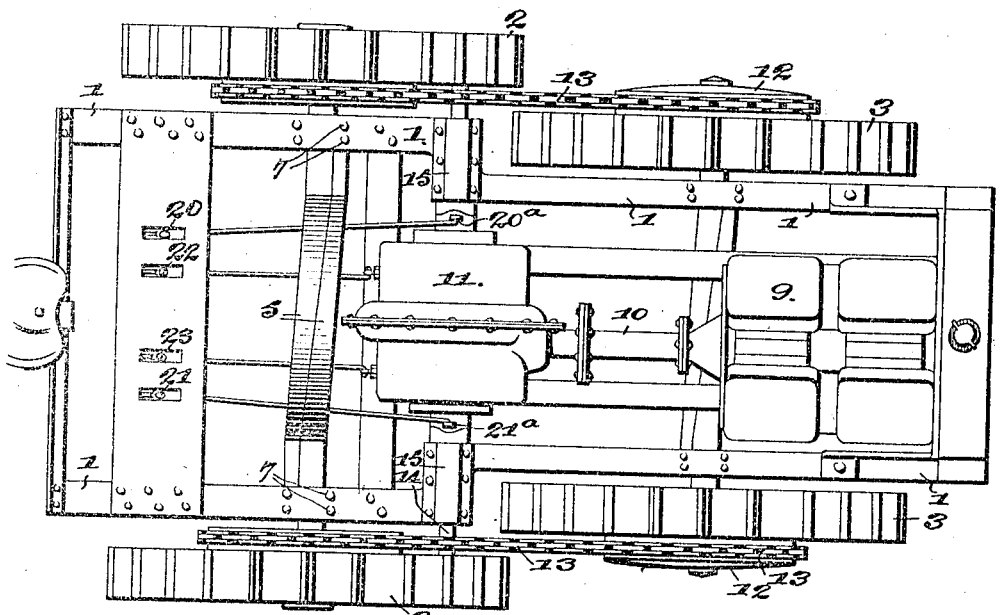
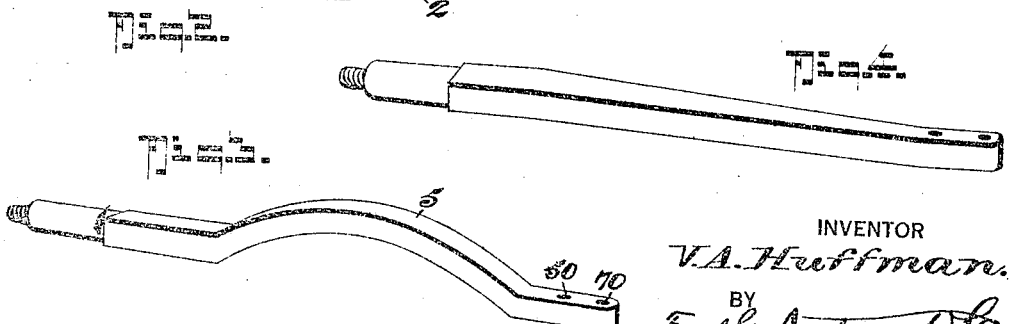
INVENTOR
V. A. Huffman.
BY
Fred G. Dieterich & Co.
ATTORNEYS V. A. HUFFMAN.
FARM TRACTOR.
APPLICATION FILED JULY 30, 1917.
1,292,606.
Patented Jan. 28, 1919.
2 SHEETS—SHEET 2.
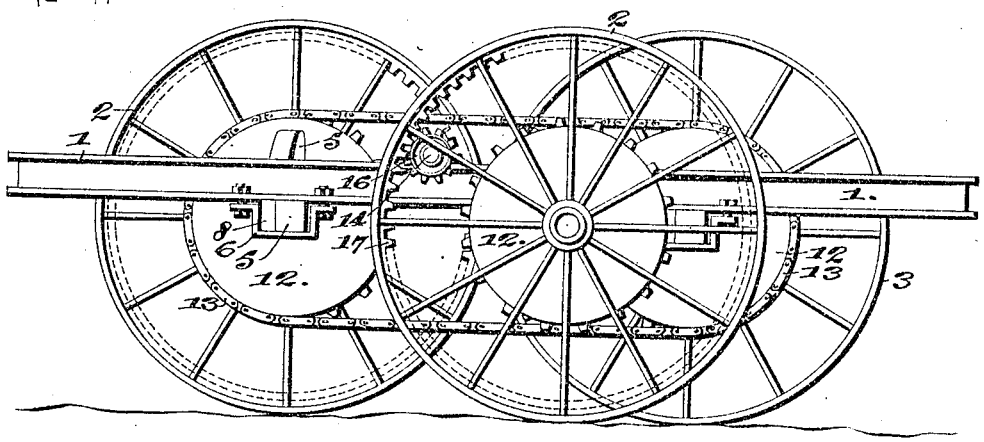
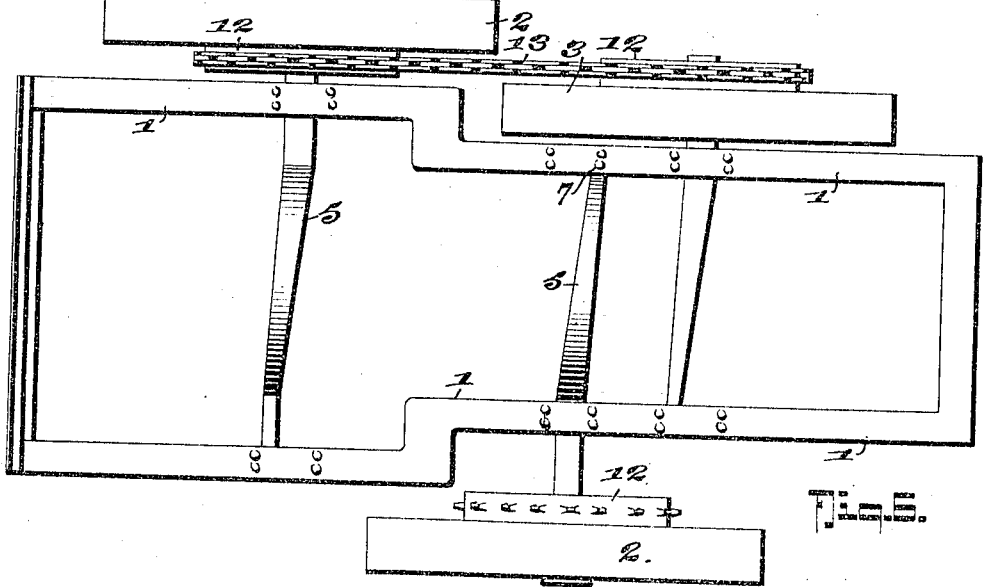
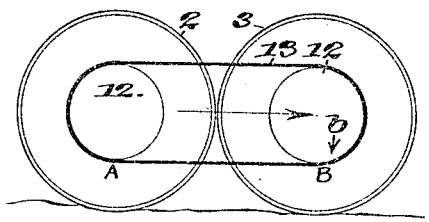
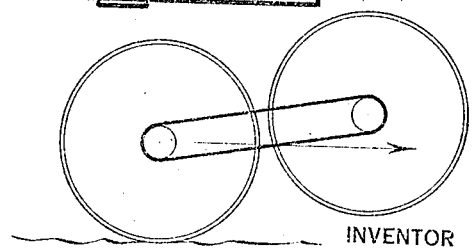
INVENTOR
V. A. Huffman.
BY
Fred G. Dieterich
ATTORNEYS

UNITED STATES PATENT OFFICE.

VERNE A. HUFFMAN, OF ROANOKE, INDIANA.

FARM-TRACTOR.

1,292,606.

Specification of Letters Patent.  Patented Jan. 28, 1919.

Application filed July 30, 1917.  Serial No. 183,545.

*To all whom it may concern:*

Be it known that I, VERNE A. HUFFMAN, a citizen of the United States, residing at Roanoke, in the county of Huntington and State of Indiana, have invented a new and Improved Farm-Tractor, of which the following is a specification.

My invention has reference to motor driven vehicles, particularly to farm tractors, and primarily it has for its purpose to provide an improved construction of farm tractor of a comparatively simple and inexpensive character and in which the parts are especially designed whereby the tractor may be readily adjusted in order to better serve the different purposes for which farm tractors are usually provided.

Another object of my invention is to provide, in a farm tractor, an improved arrangement of tractor wheels with each wheel on an axle or stub of its own, to allow for removing any one of the wheels without disturbing the other and whereby to provide a four wheeled or three wheeled tractor to suit the particular purpose for which the tractor is to be utilized.

Again, my present invention has reference to an improved tractor frame construction, especially adapted for use for engine controlled steering mechanism of that type in which power may be readily transmitted to the main or master tractor wheels to drive them in unison, or for cutting off the power from one of the driven or master wheels and apply power to the other for holding the right or left hand driving wheel, when pulling the farm implement around a corner.

Again, my invention seeks to provide an improved construction of tractor body of that type in which the drivers are controlled by engine driven steering mechanism, particularly of that type disclosed in my co-pending application, Serial No. 183,546, filed on even date with this application.

Furthermore, my invention has for its purpose to provide in a farm tractor construction, an improved arrangement of the driving tractors and a front or auxiliary tractor wheel for each driving tractor and transmission devices coupling each pair of driving and auxiliary tractor wheels, at each side, whereby a double traction contact is provided and the power or force so applied to the front or auxiliary tractor wheels that the said wheels are held from lifting from the ground on over draft.

Again, my invention, in its more complete make-up, includes an improved means for interchangeably mounting the main or master wheels whereby to readily arrange the tractor as a three wheeled tractor, by omitting either the right or left hand front or auxiliary tractor wheel and shifting one or the other of the master wheels forward and connecting the two master wheels with the power or driving shafts so as to utilize one of the said master wheels as a pivot wheel.

With other objects in view that will hereinafter appear, my invention embodies certain features of construction and combination of parts fully set out in the following description, specifically pointed out in the appended claims and illustrated in the accompanying drawings, in which:

Figure 1 is a side elevation of my invention, the same being arranged as a four wheeled tractor.

Fig. 2 is a top plan view thereof.

Fig. 3 is a perspective view of one of the rear arched axle sections.

Fig. 4 is a similar view of a front axle section.

Fig. 5 is a side elevation showing my invention arranged as a three wheeled tractor.

Fig. 6 is a top plan view of the tractor frame shown in Fig. 5.

Figs. 7 and 8 are diagrammatic views hereinafter specifically referred to.

In carrying out my invention, the chassis or main frame includes channel iron side beams 1—1, the forward ends of which are spaced a less distance apart than the rear ends to provide for staggeredly mounting the rear or driven main tractor wheels 2—2 and the front or auxiliary tractor wheels 3—3, when my improved tractor is arranged as a four wheeled tractor, as shown in Figs. 1 and 2.

The master or tractor wheels 2—2 and the front or auxiliary tractor wheels 3—3 are of uniform diameter and each pair of main tractor wheels is journaled on a two part rear arched axle consisting of two like members 5—5 that engage pendent bearing brackets 6—6 bolted at a desired place onto the side beams 1—1 and to provide for readily removing any section of the front or rear axles, one end of the axle section is provided with bolt apertures 50 and 70 for receiving the clip bolts 7—7 that secure them to the side beams 1—1, as shown.

By mounting each tractor wheel on an axle stub of its own, different arrangements of the tractor wheels can be conveniently made by removing only that section of the axle with its coöperative wheel and closing the gap in the bearing brackets 6—6 by a suitable wedge 8, see Fig. 5, in which the front right hand auxiliary wheel is omitted and the right hand main tractor wheel shown as shifted forward to form the right hand pivot wheel, when the work being done by the tractor requires short right hand turns, it being understood to provide for left hand turns, the left side of the tractor is accordingly adjusted and the right hand side remains as in Figs. 1 and 2.

The object in making the rear axle sections arched, as stated and shown, is to allow ample room for lifting plows and like implements when my tractor is a four wheeled one. When arranged as a three wheeled tractor, the rear axle need not be arched, since in turning corners, it will not be necessary to lift the plows.

9 designates a motor engine and 10 a casing in which the engine driven shaft is projected and which drives the combined driving and steering mechanism that is mounted within the two compartment casing 11 and which will be hereinafter generally referred to when describing the manner of transmitting power to both of the main tractor wheels, or either of said wheels or power simultaneously in one direction to one of the said wheels and in the other direction to the other wheel, it being understood that in this application I make no claim to the specific driving and steering mechanism generally referred to, since the said mechanism forms the subject matter of my copending application before mentioned.

In both forms of my improved farm tractor, all of the wheels are of the same diameter and each has a chain or sprocket gear 12—12 and the said sprocket wheels are of one-half the diameter of the tractor wheels, the reason for which will presently appear, and when my tractor is of the four wheeled type shown in Figs. 1 and 2, each set of chain wheels 12, at each side, is joined by an endless power transmission chain 13—13.

14—14 designate a pair of driven shafts in transverse alinement and each journaled at its outer end in long bearings 15—15 mounted on top of the side beams 1—1 and each shaft is provided with a drive pinion 16—16.

When arranged as a four wheeled tractor, the pinion 16—16 of the two shafts 14—14 engage an internal annular gear 17 on the master tractors 2—2, as is clearly shown in Fig. 1, it being apparent from the said Fig. 1 that, when the pinion 16 is driven in the direction of the arrow $x$, the wheel 2 and the front or auxiliary wheel are driven forwardly and, when the pinion 16 is run in the opposite direction, the tractor is driven backwardly and, since by making the sprockets 12 half the diameter of the tractor or driving wheels and placing the pinion shafts 16—16 on top of the frame beams 1—1, there is ample room to extend the pinion shafts and the pinions out under the upper portion of the transmission chain.

By mounting the driving elements, particularly the transmission chains and the sprockets 12, as shown and described, the pull of the chains is at the lower rear edge of the back sprocket 12, as designated by A, and at the lower forward edge of the front sprocket 12, as indicated by B, the pull force of the said transmission chain 12 on the rear and front tractor wheels being so applied that the pull of the chains at A (not only the engine pull) but the pull of the resistance set up at B by the auxiliary wheel, is the force that positively prevents the front end of the tractor from flying or lifting up from the ground on over draft (see diagram Fig. 7), since the said pull force tends to draw the front wheels down, notice arrow $b$, and thereby causes such front wheels to act as an anchor to the power as well as a part of the traction system.

In my present application, I have diagrammatically illustrated four levers 20—21, 22—23, of which 20—21 connect with clutch members $20^a$—$21^a$ on the pinion shafts 14—14 at their respective sides and 22—23 connect with the brake bands that form a part of the driving and steering mechanism contained within the two part casing before referred to, and it should be again mentioned that the mechanism referred to is specifically illustrated and described in my copending application and is arranged, that under proper adjustments through the levers 20—21, 22—23, the power may be transmitted for driving the main tractors 2—2 in the same direction forwardly or backwardly, forwardly to one of the main tractors while the other tractor remains inert or, as the other tractor wheel turns backwardly or held at neutral when the tractor is to stop, while the engine is still running.

By mounting each wheel upon its own axle, either of the front wheels 3 may be readily removed and the tractor wheel at that side from which the front wheel 3 is removed, may be moved up to form, as it were, a pivot wheel when turning the tractor right or left according to whether the right or left side tractor wheel is shifted.

In Fig. 6, I have shown the machine adapted for finishing corners and making right hand turns or when to be used in the harvest field where the three wheel tractor serves the purpose better than does a four wheel tractor.

When the machine is arranged as a three wheeled tractor, the single tractor wheel at one side is so mounted relatively to the driving pinion at that side that the pinion engages the internal gear on the centered tractor wheel 2 on the down going side, as the driven pinion on the other side engages the internal gear on its respective tractor wheel on the up-going side and by reason of such connections, one of the said pinions pulls or lifts up the rim of its adjacent tractor wheel while the other pinion pulls down on the rim of its respective wheel. This method of driving the oppositely disposed tractor wheel is an advantageous one, since the effect of the opposite action of the oppositely disposed driving pinions that pull is to hold the tractor wheels 2—2 to the ground, i. e., the machine can not rise up in front or in any direction which is a great desideratum in the use of like or farm tractors, since the tendency of like tractors is to lift or hoist up at the front end from traction engagement with the ground under an overload or heavy pull.

From the foregoing taken in connection with the drawing, the complete construction, the manner in which the parts may be readily adjusted to provide either a four wheeled or a three wheeled tractor, the manner in which the tractor in either form operates and its advantages will be readily apparent to those skilled in the art to which my invention relates.

What I claim is:

1. The combination with a frame; of traction wheels, an independent axle for each wheel, means for adjustably mounting each axle at predetermined points on the frame and power transmission coupling at least two of the wheels at one side.

2. The combination with a frame; of traction wheels, an independent axle for each wheel, means for adjustably mounting each axle at predetermined points on the frame and power transmission coupling at least two of the wheels at one side, a motor engine on the frame and means for coupling up the said engine with individual ones of the tractor wheels or a plurality of such wheels, for imparting direct or alternate movement to the plurality of wheels or movement individually to either of said wheels.

3. The combination with a frame; of a pair of oppositely disposed main tractor wheels each having an independent axle, the said axles being each adjustably mountable along the frame, a driving power on the frame, power transmission mechanism connecting the driving power and the two main tractor wheels, said power mechanism including two shafts, one for each main tractor wheel, said shafts having a relatively fixed position on the frame and a separate gear connection between each of the said main tractor wheels and their adjacent driven shafts and at least one auxiliary or front tractor wheel geared with the main tractor wheel at its respective side of the frame.

VERNE A. HUFFMAN.

Copies of this patent may be obtained for five cents each, by addressing the "Commissioner of Patents, Washington, D. C."